(12) United States Patent
Baudasse et al.

(10) Patent No.: US 8,151,414 B2
(45) Date of Patent: Apr. 10, 2012

(54) SELF-DRIVEN ARTICULATION FOR AN ARTICULATED ASSEMBLY SUCH AS A SATELLITE SOLAR PANEL

(75) Inventors: Yannick Baudasse, Grasse (FR); Stephane Vezain, Mandelieu (FR)

(73) Assignee: Thales (FR)

( * ) Notice: Subject to any disclaimer, the term of this patent is extended or adjusted under 35 U.S.C. 154(b) by 418 days.

(21) Appl. No.: 12/306,238

(22) PCT Filed: Jun. 20, 2007

(86) PCT No.: PCT/EP2007/056164
§ 371 (c)(1),
(2), (4) Date: Mar. 9, 2009

(87) PCT Pub. No.: WO2007/147859
PCT Pub. Date: Dec. 27, 2007

(65) Prior Publication Data
US 2009/0282646 A1   Nov. 19, 2009

(30) Foreign Application Priority Data
Jun. 23, 2006   (FR) ...................................... 06 05653

(51) Int. Cl.
*E05D 1/00*   (2006.01)
(52) U.S. Cl. ................. 16/227; 16/366; 16/286
(58) Field of Classification Search .................... 16/227, 16/373, 225, 226, 297, 366, 292, 286; 403/291, 403/111, 145, 148; 244/172.6, 172.7
See application file for complete search history.

(56) References Cited

U.S. PATENT DOCUMENTS

| 2,583,350 | A | * | 1/1952 | Witzgall | 16/382 |
|---|---|---|---|---|---|
| 3,121,909 | A | * | 2/1964 | Young | 16/286 |
| 3,386,128 | A | * | 6/1968 | Vyvyan | 16/225 |
| 4,163,303 | A | * | 8/1979 | Hanna | 16/227 |
| 4,267,608 | A | * | 5/1981 | Bora, Jr. | 403/111 |
| 4,558,911 | A | | 12/1985 | Ruoff | |
| 5,082,212 | A | * | 1/1992 | Vezain et al. | 244/172.6 |
| 5,086,541 | A | * | 2/1992 | Auternaud et al. | 16/227 |
| 5,354,589 | A | * | 10/1994 | Wass | 428/61 |
| 6,334,235 | B2 | * | 1/2002 | Duperray et al. | 16/225 |
| 6,530,498 | B1 | * | 3/2003 | Ovadia | 16/286 |
| 7,425,103 | B2 | * | 9/2008 | Perez-Sanchez | 16/227 |
| 2001/0037538 | A1 | * | 11/2001 | Duperray et al. | 16/225 |
| 2005/0175406 | A1 | * | 8/2005 | Perez-Sanchez | 403/373 |
| 2009/0000062 | A1 | * | 1/2009 | Yamanami | 16/366 |

FOREIGN PATENT DOCUMENTS

| EP | 0354837 A1 | | 2/1990 |
|---|---|---|---|
| EP | 612904 A2 | * | 8/1994 |
| FR | 2662219 A1 | | 11/1991 |

* cited by examiner

*Primary Examiner* — Victor Batson
*Assistant Examiner* — Jeffrey O Brien
(74) *Attorney, Agent, or Firm* — Baker & Hostetler LLP

(57) ABSTRACT

A frictionless self-driven articulation designed to be mounted between two neighboring elements, including two cylindrical fittings rotationally driven through the action of a leaf spring, the ends of the leaf spring being fixed respectively to each of the fittings. The articulation includes means of retaining the fittings and load transfer means separate from the retention means.

5 Claims, 4 Drawing Sheets

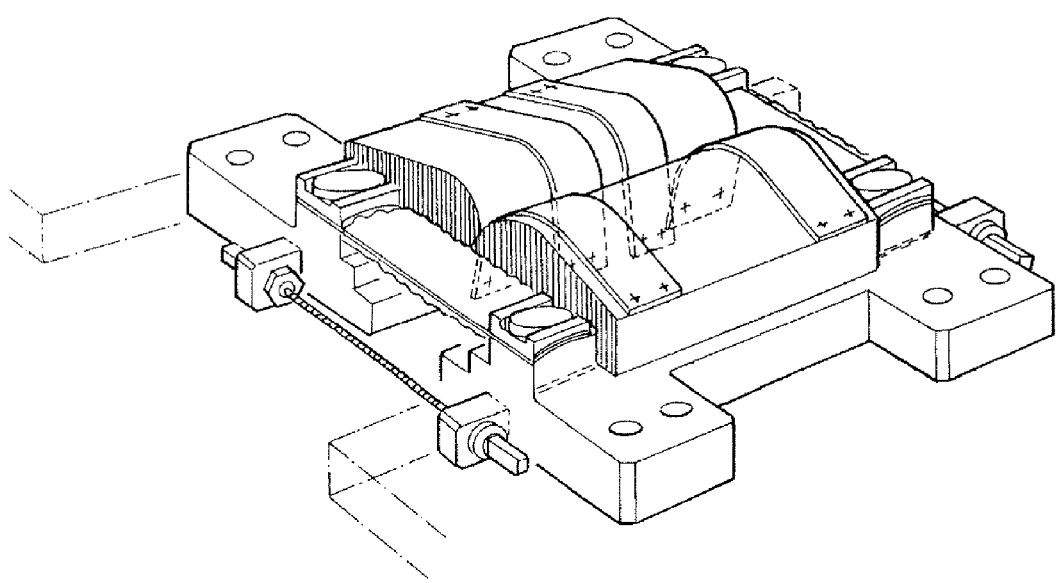
FIG_1
PRIOR ART

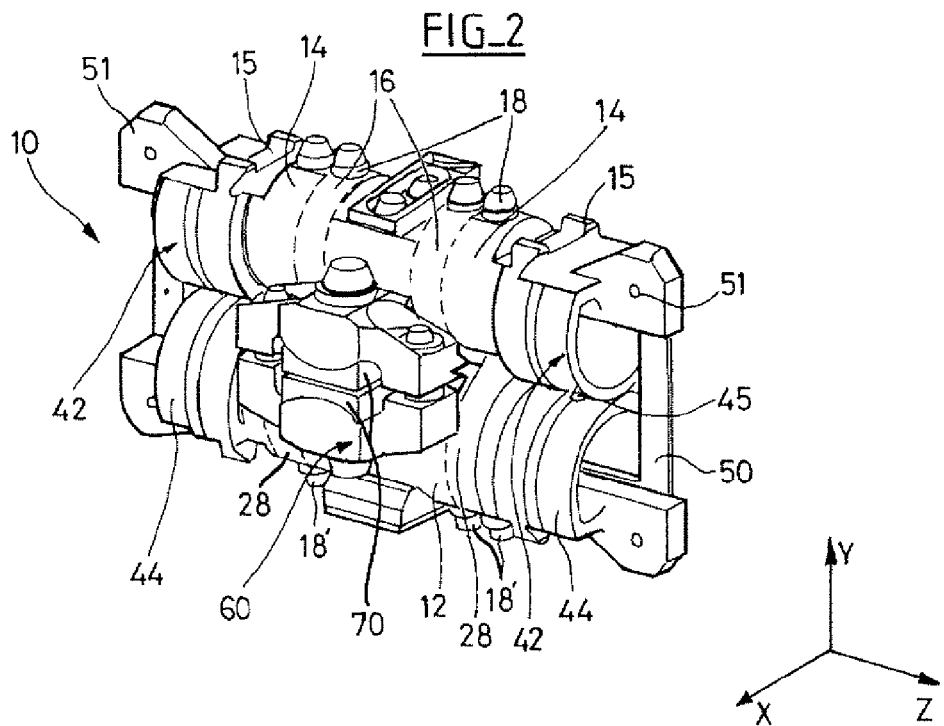
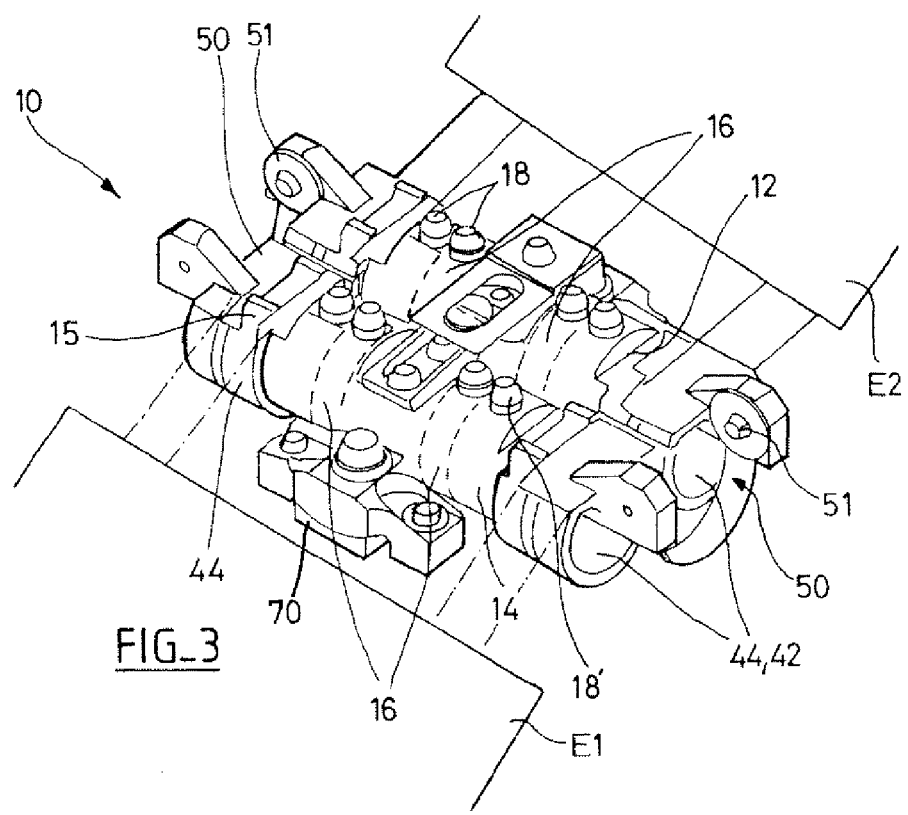

FIG_4
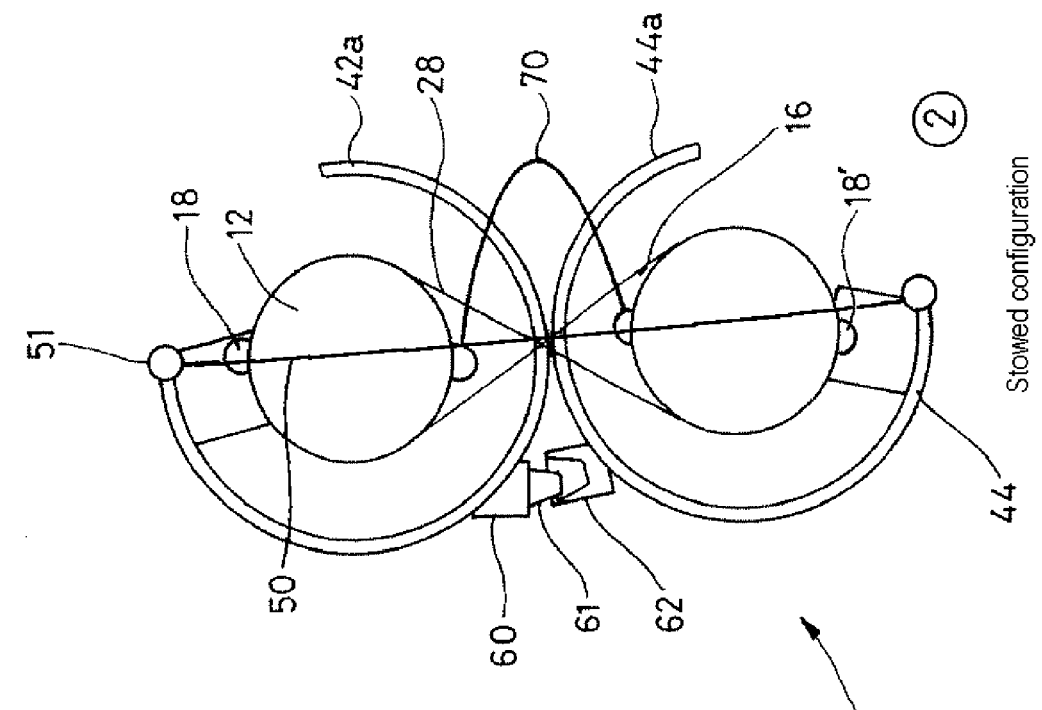
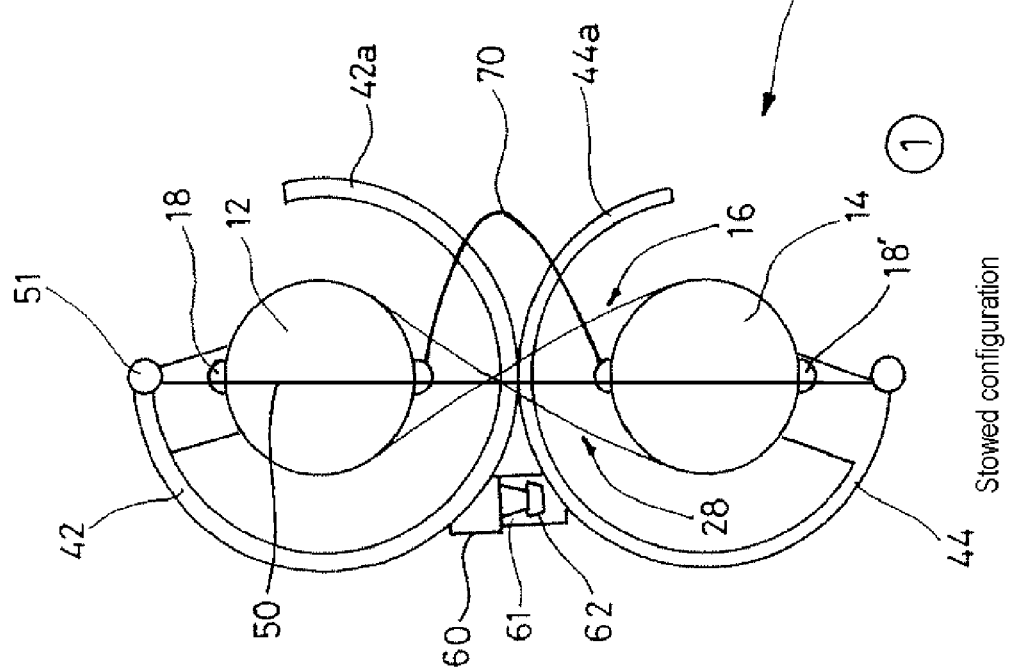

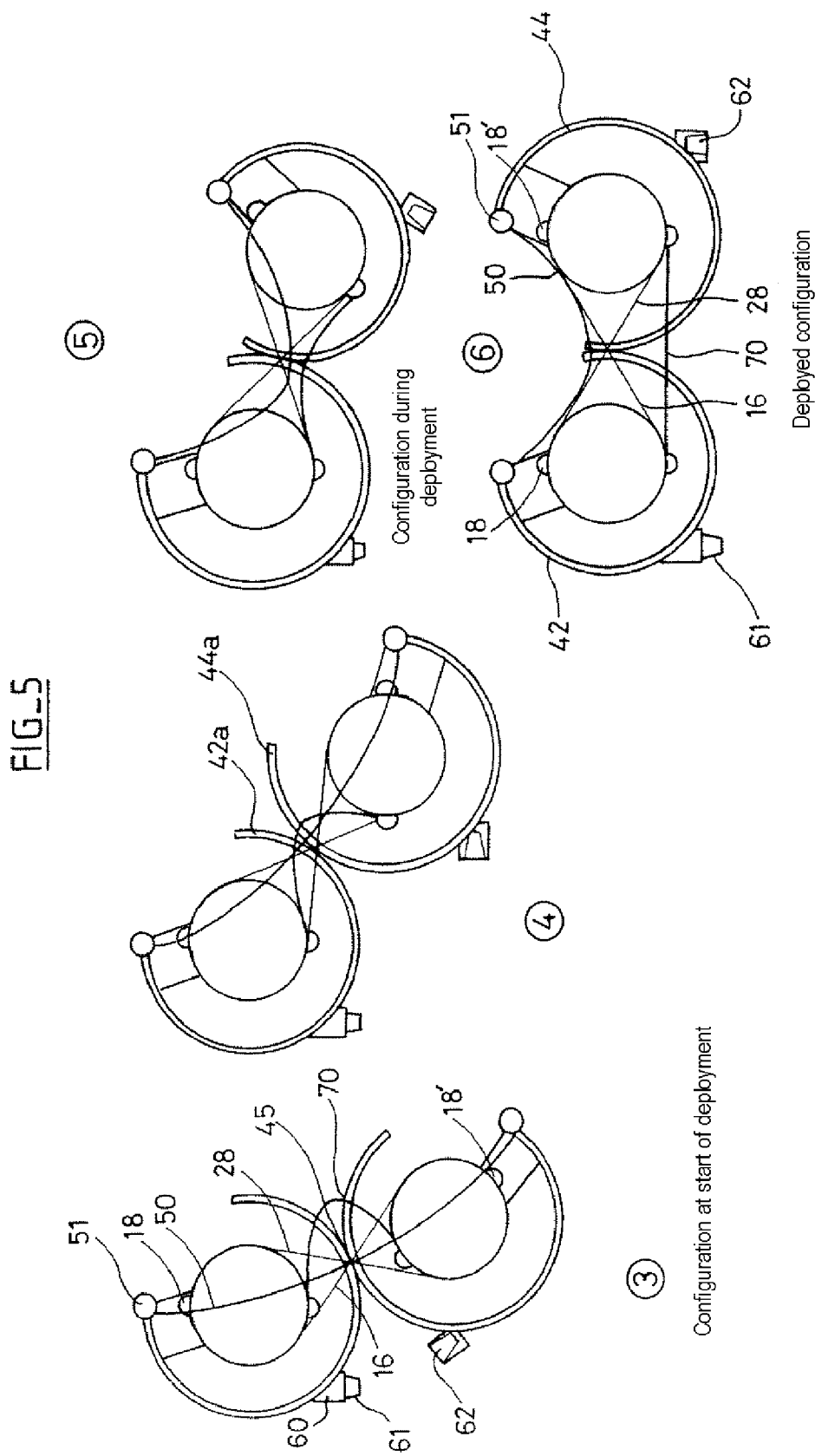

SELF-DRIVEN ARTICULATION FOR AN ARTICULATED ASSEMBLY SUCH AS A SATELLITE SOLAR PANEL

PRIORITY

This is a national stage of International Application No. PCT/EP2007/056164, filed on Jun. 20, 2007, which claims priority to France Patent Application No. 0605653, filed Jun. 23, 2006, the disclosures of each application is hereby incorporated by reference in their entirety.

BACKGROUND OF THE INVENTION

The present invention relates to a self-driven articulation, designed to handle both the automatic deployment of the elements that it links and the locking of these elements in the deployed position. The invention also relates to an articulated assembly comprising various elements interlinked by such articulations.

The invention applies more particularly but not exclusively to the space sector and notably in the manufacture of satellite solar panels that are formed by different elements articulated together as illustrated in FIG. 1 and whose deployment takes place in space. Many other applications can be envisioned, both in the space sector and on earth.

Currently, the various elements that constitute the articulated solar panels are generally interlinked by an articulation as represented in FIG. 1 and that is the subject of a patent application filing FR 2 635 077 published on 8 Aug. 1988.

This articulation takes the form of a self-driven mechanical system enabling it to be opened and consequently the elements that are linked to it to be deployed thanks to a set of cooperating mechanical elements and in particular thanks to crossed winding plates fixed to tensioning beams (allowing for a traction prestress), taking place through the action of one or more stressed driving plates exerting an operating torque when a retaining device of the articulated element in the folded position is released.

The retaining device of the solar generator is external to the articulation and is generally implemented by a bolt or explosive firing cup.

The system described in the prior art does not make it possible to provide a stable and regular tension in the winding plates, because of the numerous losses of tension through frictions between the cylindrical forms of the fittings and the winding plates (the tension of the winding plates being obtained by beams at the ends), regardless of the configuration of the articulation.

Furthermore, the winding plates provide the two-fold function of "rotational guidance" and "load transfer on launch". This imposes strong mechanical stresses between the two tracks in order to ensure the non-separation of the two parts of the articulation. The result is a high risk of degradation of the rolling tracks (when stowed), as well as a risk of non-deployment due to a very high sensitivity to pollutions on the tracks throughout deployment.

The aim of the present invention is to resolve these problems.

SUMMARY OF THE INVENTION

The articulation proposed according to the invention, because of the new weight-reduction possibilities that it proposes, is particularly suited to the lateral panels of solar generators of the LPS (light panel structure) type.

This articulation also makes it possible to provide, just like the articulation described in the document cited which represents the closest state of the art, a minimal resistant torque on deployment and a guarantee of its integrity without requiring its complete deployment.

The subject of the present invention is, more particularly, a frictionless self-driven articulation designed to be mounted between two neighboring elements, comprising two cylindrical fittings rotationally driven through the action of at least one flexible element, of the leaf spring type, the ends of this element being fixed respectively to each of the fittings, mainly characterized in that it includes means of retaining the fittings and load transfer means separate from the retention means.

The flexible tracks are fixed to the fittings so as to be facing in pairs.

As in the prior art, the flexible element, of leaf spring type, is offset relative to the point of contact, from the flexible tracks, which makes it possible to ensure locking in the deployed position.

The load transfer means include a coupling device and at least two flexible lateral plates.

The coupling device includes two load transfer pawls each fixed to a flexible track and two housings fixed to the facing flexible tracks, associated with the two lateral plates, each respectively fixed at each end to the two fittings, to provide an anti-separation function for the articulation.

Thus, in the stowed position, the two load transfer pawls and the two facing housings, coupled to the two lateral plates providing an anti-separation function for the articulation, make it possible to ensure retention in position and in particular a force transfer, in high load cases.

Each flexible track is fixed by one end to a fitting external to the fixing of the winding plates and facing each other in pairs.

BRIEF DESCRIPTION OF THE DRAWINGS

Other particular features and benefits of the invention will become clearly apparent on reading the description that is given hereinbelow and that is given by way of illustrative and nonlimiting example, and in light of the figures in which:

FIG. 1 represents the diagram of an articulation according to the state of the art, FIG. 2 represents the diagram of an articulation according to the invention, the articulation being in the "stowed" position, FIG. 3 represents the diagram of the articulation according to the invention in the deployed position, FIG. 4 diagrammatically represents the deployment kinematics of the articulation illustrated by the stowed configuration and start of deployment steps 1, 2, FIG. 5 diagrammatically represents the deployment kinematics of the articulation illustrated by the steps 3 to 6 for changing to the deployed position.

DETAILED DESCRIPTION OF THE PREFERRED EMBODIMENTS

The articulation according to the invention comprises two fittings 12, 14 consisting, for example, of two machined cylindrical metal blocks. These fittings are possibly lightened by voids when the application justifies it as is notably the case in the space sector. Each of the fittings 12 and 14 is designed to be fixed to a corresponding element E1, E2 by any appropriate means such as screws or rivets at the anchor points 15.

The flexible tracks 42 and 44 each include a cylindrical surface 42a and 44a having in cross section the form of an arc of circle, the length of which is greater than 270°. The cylindrical surface radii 42a and 44a are equal.

Thus, the surfaces of the flexible tracks 42 and 44 are able to roll one over the other to enable the elements E1 and E2 to be displaced between two extreme positions offset by 180° relative to each other. When the elements E1 and E2 are flat elements, the first of these positions is called folded or stowed, corresponding to the case where the elements E1 and E2 are folded one against the other and parallel to each other, whereas the second position, called deployed position, corresponds to the case where these elements are opened and arranged in the same plane.

In order to retain the cylindrical surfaces 42a and 44a of the flexible tracks in permanent contact when they roll one against the other, the articulation 10 also comprises flexible members whose ends are fixed to each of the fittings so as to roll over the surfaces 12a and 14a. These members take the form of four flexible metal plates 16 and 28, made for example of stainless steel, that are called winding plates or control plates.

As an example, the articulation 10 comprises two adjacent central winding plates 16, arranged in the central part of the fittings 12 and 14 and wound in the same direction on the cylindrical surfaces 12a and 14a either side of a median plane common to these fittings. A first end of each of the winding plates 16 is fixed directly to the fitting 12. This fixing is provided, for example, by screws 18 and 18'. From this end, the plates 16 pass between the cylindrical surfaces 12a and 14a of the fittings so as to be successively in contact with the surface 12a then with the surface 14a. A movement of the articulation in the direction of deployment therefore has the effect of unwinding the plates of a fitting and simultaneously winding them onto the opposite fitting.

In the example illustrated, the articulation 10 comprises two other winding plates 28, fixed to the internal parts of the fittings 12, 14, close to each of the plates 16 (which are fixed to the outer parts of fittings 12, 14) in a manner that is also symmetrical relative to a median plane of the fittings. These winding plates are wound in the reverse direction of the plates on the fittings so that the plates 16, 28 cross on the cylindrical parts of the fittings.

The articulation further comprises flexible tracks 42, 44 concentric to the cylindrical surfaces of the winding fittings 12a, 14a.

Each track 42 or 44 is fixed via one end to a fitting external to the attachment points 15 on the fittings. The flexible tracks 42 fixed to the fitting 12 are facing the tracks 44 fixed to the fitting 14 and present a point of contact 45 on their outer surface.

The use of the flexible tracks 42, 44 to provide a prestress on the winding plates 16, 28 makes it possible to apply a stable and uniform force throughout deployment, at a point 45, without loss of tension (which was the case with the articulation represented in FIG. 1). This solution makes it possible in effect to exert a direct tension at the point of winding contact 45. Thus, with the flexible tracks 42, 44, the prestress is stable in all the configurations of the articulation: stowed, during deployment and deployed.

The lateral plates 50 fixed to the fittings by screws 51 or equivalent means offer an additional drive on opening. These plates 50 are fixed so as to be arranged in a plane passing through the axes of the fittings in the stowed configuration. On opening, the offset of the plates relative to the axis of the fittings provokes a slight drive which facilitates the extraction of the retention pawls 61 from their housing 62.

The load transfer system comprises two pawls 61 and two housings 62 facing each other retained on a support 60, fixed to the flexible tracks 42, 44. The pawls 61 have a conical form to provide an easy engagement or disengagement on deployment of the lateral plates 50.

The pawls 61 are designed for the transfer of the forces on the axes X, Z and the torques about the axis Y. The two lateral plates (parallel to the axis Y) are intended for the transfer of the forces on the axis Y and the torques about the axis X as well as the pawl disengagement forces.

In the stowed configuration, the lateral plates 50 are taut, these plates provide the articulation with an anti-separation function. The flexible tracks 42, 44 are prestressed by the lateral plates 50. This additional prestress makes it possible to relax and therefore protect the winding plates 16, 28 from any mechanical attacks in the launch phase.

In the stowed configuration, the loads applied to the articulation are great. In the practical exemplary embodiment described and illustrated by the figures, the position retention function is therefore provided by the two load transfer pawls 61 and by the two prestressing plates 50, the flexible tracks 42 and 44 ensuring pressing of the pawls 61 into their respective housings and the tension in the lateral plates 50.

When the appendages to be deployed are released, the articulation rotates under the effect of the drive combined with the flexible drive element 70 and the lateral plates 50, this rotation of the articulation enabling an instantaneous separation of the pawls 61 (of conical form).

For the operation of the articulation, reference can be made to FIGS. 4 and 5. These figures diagrammatically represent the deployment kinematics.

FIG. 4 illustrates the steps 1, 2 corresponding respectively to the stowed configuration and the start of deployment (separation of the pawls). The continuation is illustrated by the steps 3 to 6 of FIG. 5 culminating in the final deployed configuration (step 6).

In the first degrees of opening, through the action of the flexible tracks 42, 44, the winding plates 16, 28 are progressively loaded to a nominal tension. Simultaneously, the lateral plates 50 are unloaded then folded on themselves offering a limited resistant torque.

The solution described allows for, because of the installation of specific elements for transferring loads on launch, a reduction of the tension in the winding plates, resulting in a reduction in the winding diameter of the plates on the fittings and therefore a major reduction in the size and overall weight of the articulation. As an example, the weight of the articulation produced is 50% less (compared to the prior art).

This solution also makes it possible: to obtain a motor torque at any moment in deployment, as well as an extra drive at the start of deployment; to guarantee the deployment (parts not stuck) without the need for complete opening; a reduction in the costs and production engineering lead times for an articulation with winding plates; a reduction in the weight and volume of an articulation with winding plates; a significant reduction in the risks of nondeployment, due to external pollutions, because of a reduced tension between the rolling tracks; a simplified integration of the articulation (notably on solar generator panels).

The invention claimed is:
1. A frictionless self-driven articulation designed to be mounted between two neighboring elements, comprising:
   a first fitting which rotates about a first axis interior to the first fitting;
   a second fitting which rotates about a second axis interior to the second fitting and parallel to the first axis of rotation;

a leaf spring, the ends of which are fixed respectively to the first and second fittings, which rotationally drives the first and second fittings from a stowed configuration to a deployed configuration;

first winding plates which unwind from the first fitting and wind onto the second fitting when the leaf spring rotationally drives the first and second fittings;

second winding plates which unwind from the second fitting and wind onto the first fitting when the leaf spring rotationally drives the first and second fittings;

first tracks concentric to the first axis; and second tracks concentric to the second axis and in direct contact with the first tracks;

wherein the first and second tracks maintain separation of the first and second fittings and provide prestress on the first and second winding plates when the leaf spring rotationally drives the first and second fittings.

2. The articulation as claimed in claim 1, further comprising two flexible lateral plates which provide prestress on the first and second tracks when the first and second fittings are in the stowed configuration.

3. The articulation as claimed in claim 2, further comprising a load transfer pawl fixed to one of the first tracks and a housing fixed to the second track, to prevent rotation of the first and second fittings when the first and second fittings are in the stowed configuration.

4. The articulation as claimed in claim 1, in which each first track is fixed by one end to the first fitting external to a fixing point of the first winding plates to the first fitting and faces a respective one of the second tracks as a pair.

5. The articulation as claimed in claim 2, wherein the lateral plates are arranged in a plane passing through the first and second axes of the fittings when the first and second fittings are in the stowed configuration.

* * * * *